US012732774B2

(12) United States Patent
Tanizaki et al.

(10) Patent No.: US 12,732,774 B2
(45) Date of Patent: Sep. 8, 2026

(54) INFORMATION PROCESSING DEVICE AND METHOD

(71) Applicants: TOYOTA JIDOSHA KABUSHIKI KAISHA, Toyota (JP); AISIN CORPORATION, Kariya (JP)

(72) Inventors: Daisuke Tanizaki, Okazaki (JP); Chihiro Watanabe, Ama (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 325 days.

(21) Appl. No.: 18/402,101

(22) Filed: Jan. 2, 2024

(65) Prior Publication Data

US 2024/0284141 A1 Aug. 22, 2024

(30) Foreign Application Priority Data

Feb. 22, 2023 (JP) ................................ 2023-026312

(51) Int. Cl.
*H04W 4/02* (2018.01)
*H04W 4/021* (2018.01)

(52) U.S. Cl.
CPC .................................. *H04W 4/021* (2013.01)

(58) Field of Classification Search
CPC ..................................................... H04W 4/021
USPC ....................................................... 455/456.3
See application file for complete search history.

(56) References Cited

U.S. PATENT DOCUMENTS

2010/0248746 A1* 9/2010 Saavedra ........... G01C 21/3679 455/456.3
2020/0264007 A1* 8/2020 Yoo ........................... G06T 7/74
2021/0092218 A1* 3/2021 Ganesan ................. G06F 16/29

FOREIGN PATENT DOCUMENTS

JP 2015-052981 A 3/2015

* cited by examiner

*Primary Examiner* — Joel Ajayi
(74) *Attorney, Agent, or Firm* — Oliff PLC

(57) ABSTRACT

A server acquires a first geographical range, in which the provision of information on a first Point Of Interest (POI) to a user of a mobile terminal is effective, based on the position information on the first POI and on the information on the movement of the mobile terminal, and sends the information on the first POI, and the first geographical range to the mobile terminal. The mobile terminal receives the information on the first POI, and the first geographical range and, when the mobile terminal is within the first geographical range, provides the information on the first POI.

3 Claims, 6 Drawing Sheets

FIG. 4

| INFORMATION ID | EFFECTIVE RANGE | EFFECTIVE PERIOD | WEATHER | . . . |
|---|---|---|---|---|
| | | | | |
| | | | | |
| | | | | |
| | | | | |
| | | | | |

.
.
.

INFORMATION PROCESSING DEVICE AND METHOD

CROSS-REFERENCE TO RELATED APPLICATION

This application claims priority to Japanese Patent Application No. 2023-026312 filed on Feb. 22, 2023, incorporated herein by reference in its entirety.

BACKGROUND

1. Technical Field

The present disclosure relates to information delivery.

2. Description of Related Art

A content provision system is disclosed that, when providing content to a user, determines an information acceptance level indicating how much information the user is willing to accept and, according to the information acceptance level, determines the output form of the content (for example, Japanese Unexamined Patent Application Publication No. 2015-052981 (JP 2015-052981 A)). For example, when the user is driving a vehicle, the driving load during a right/left turn is greater than during straight-ahead driving and, therefore, the information acceptance level is lower and, in this case, the content is output, for example, in a form in which only the presence or absence of the content is displayed without detailed information.

SUMMARY

An object of one aspect of the disclosure is to provide an information processing device and method that can provide information to the user of a mobile terminal in a more timely manner.

One aspect of the present disclosure relates to an information processing device including a control unit. The control unit is configured to acquire a first geographical range based on the position information on a first Point Of Interest (POI) and on the information on the movement of a mobile terminal. The first geographical range is a range in which the provision of information on the first POI to a user of the mobile terminal is effective. The control unit is also configured to provide the information on the first POI to the user of the mobile terminal when the mobile terminal is within the first geographical range.

Another aspect of the present disclosure relates to a method including acquiring, sending, and outputting. The acquiring is performed by a server by acquiring a first geographical range based on the position information on a first Point Of Interest (POI) and on the information on the movement of a mobile terminal. The first geographical range is a range in which the provision of information on the first POI to a user of the mobile terminal is effective. The sending is performed by the server by sending the information on the first POI and the first geographical range to the mobile terminal. The outputting is performed by the mobile terminal by outputting the information on the first POI when the mobile terminal is positioned within the first geographical range.

According to one aspect of the present disclosure, information can be provided to a mobile terminal user in a more timely manner.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram showing an example of a provision waiting list held in the vehicle;

DETAILED DESCRIPTION OF EMBODIMENTS

Figure 1:
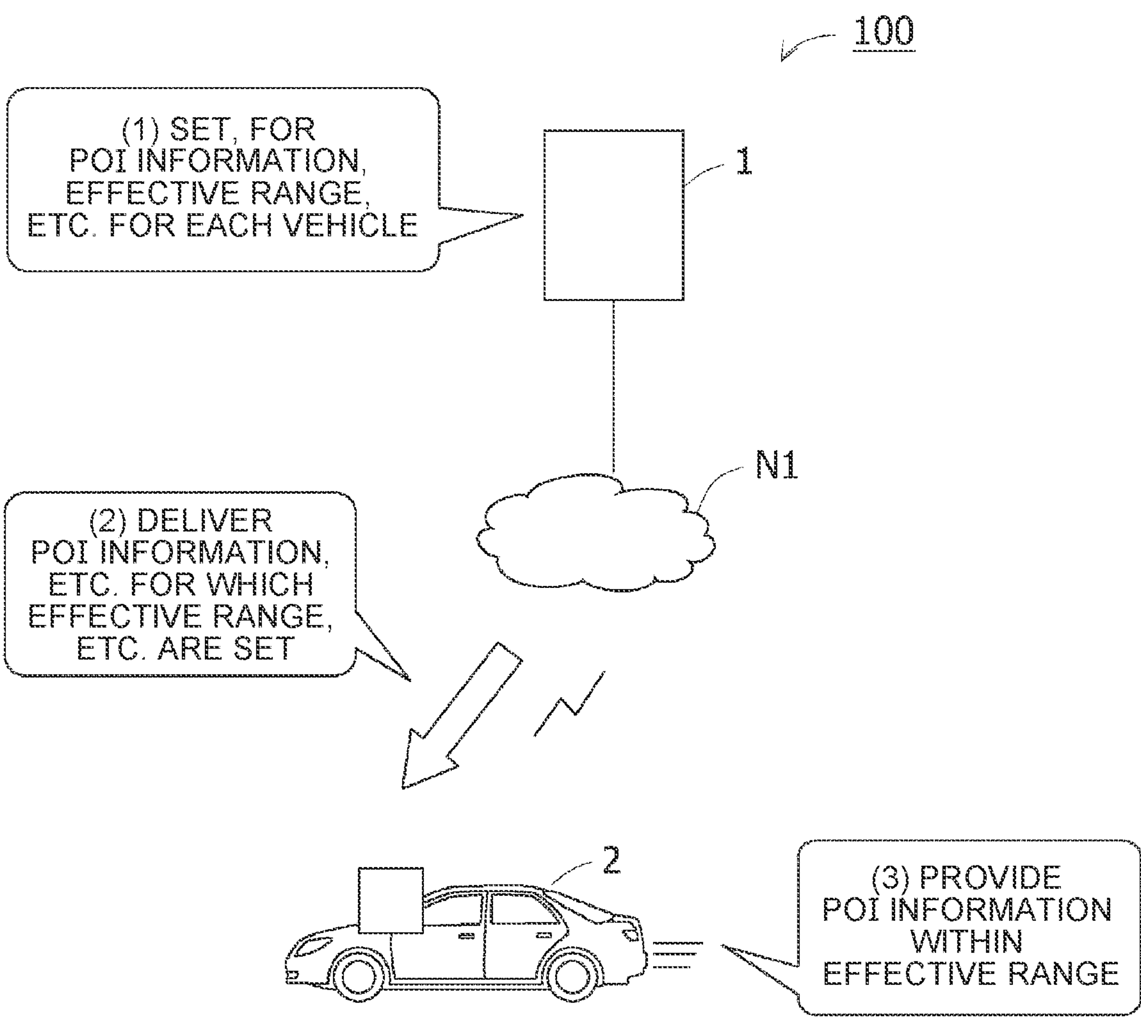
FIG. 1 is a diagram showing an example of a configuration of an information delivery system according to a first embodiment.

A POI is a specific point on a map. More specifically, POIs include, for example, facilities, sightseeing spots, stores, and points. For example, in the service for delivering information on a POI to a mobile terminal such as a vehicle, the information on a target POI, if provided after the vehicle has passed the POI, may become meaningless.

In view of the above problem, one aspect of the present disclosure is to provide POI information when a mobile terminal is positioned in a geographical range in which the provision of the information on the POI is effective. More specifically, one aspect of the present disclosure is an information processing device including a control unit. The control unit is configured to acquire a first geographical range based on the position information on a first POI and on the information on the movement of the mobile terminal. The first geographical range is a range in which the provision of information on the first POI to a user of the mobile terminal is effective. In addition, the control unit is configured to provide the information on the first POI to the user of the mobile terminal when the mobile terminal is within the first geographical range.

The information processing device is, for example, a server or a mobile terminal. Examples of mobile terminals include an in-vehicle device, a smartphone, a tablet terminal, and a personal computer (PC). Examples of in-vehicle devices include a data communication module (DCM), a car navigation system, and a drive recorder. The control unit is, for example, a processor such as a central processing unit (CPU). Examples of POIs include a store, facilities, a sightseeing spot, and a point that is set for the destination. For example, when the POI is a store, the information on the POI includes the location of the store, business hours, introduction information, and coupons. When the POI is a point that is set as the destination, the information on the POI may be, for example, the weather in the area that includes the point. The information on the POI may be set freely, depending on the type of POI or by the originator of the information on the POI.

The information on the movement of a mobile terminal is, for example, the information on the movement that is being performed, or is scheduled to be performed in the future, by the mobile terminal. The information on the movement of the mobile terminal includes information on at least one of the speed, traveling direction, route, and type of road on which the mobile terminal is travelling. The first geographical range, in which the provision of information on the first POI to the user of the mobile terminal is effective, is set on the starting point side of the mobile terminal, or on the mobile terminal side when located ahead in the traveling direction of the mobile terminal, when viewed from the first POI. The size of the first geographical range may be set, for example, as the distance or time required for the mobile terminal to reach the first POI, the range of a predetermined distance from the first POI, or the area including the first POI.

According to one aspect of the present disclosure, the information on the first POI is provided to the user at a time when the mobile terminal is positioned within the first geographic range. This allows the information to be provided to the user of the mobile terminal in a more timely manner.

In one aspect of the present disclosure, the information processing device may be a server. In this case, the control unit included in the server may be configured to cause the mobile terminal to provide the information on the first POI to the user of the mobile terminal when the mobile terminal is positioned within the first geographical range by sending the information on the first POI, and the first geographical range to the mobile terminal. That is, when the server is the information processing device, sending the information on the first POI, and the first geographical range to the mobile terminal results in providing the information on the first POI to the user of the mobile terminal when the mobile terminal is within the first geographical range. This makes it possible to make the processing load of the mobile terminal smaller than when the mobile terminal itself determines the first geographic range. In addition, since the server acquires the first physical range for each of the mobile terminals, the first physical range differs according to each movement of the mobile terminals even when the information on the first POI is the same, meaning that the server can provide services according to each of the mobile terminals.

In one aspect of the present disclosure, the information processing device may be a mobile terminal. In this case, the control unit included in the mobile terminal may be configured to acquire the information on the first POI, and the first geographical range by receiving from another device. The control unit may be configured to store the information on the first POI in a storage unit. The control unit may be configured to provide the information on the first POI when the mobile terminal is not in a predetermined movement state and the mobile terminal is positioned within the first geographical range. On the other hand, the control unit may be configured to suspend providing the information on the first POI when the mobile terminal is in the predetermined movement state. In this case, the control unit may be configured to delete the information on the first POI from the storage unit when the mobile terminal has passed through the first geographical range without providing the information on the first POI.

The predetermined movement state of the mobile terminal, in which the provision of the information on a POI is suspended, is a state in which the provision of information may interfere with the safe movement of the user of the mobile terminal. More specifically, when the mobile terminal is a an in-vehicle device, the predetermined movement state of the mobile terminal includes the state in which the vehicle that includes the in-vehicle device is entering an intersection, the vehicle is waiting for a right turn in an intersection, and the vehicle is turning to the right or left. The predetermined movement state of the mobile terminal may also include the state of the driver of the vehicle such as the state in which the driver of the vehicle is checking for a stop and the state in which, even while the vehicle is stopped, the driver of the vehicle is concentrating on confirming safety. For example, when the mobile terminal is a smartphone, the predetermined movement state of the mobile terminal includes the state in which the user of the mobile terminal is moving by bicycle and the state in which the user of the mobile terminal is walking on a crosswalk.

The information on the first POI, if provided after the vehicle has passed through the first geographical range, will be most likely to be meaningless to the user of the mobile terminal. In one aspect of the present disclosure, when the vehicle has passed through the first geographical range without providing the information on the first POI, deleting such POI information from the storage unit makes it possible to prevent the resources of the storage unit from being occupied by useless information.

An embodiment of the present disclosure will be described with reference to the drawings. Note that the configuration of the embodiment is exemplary and the present disclosure is not limited to the configuration of the embodiment.

First Embodiment

FIG. 1 is a diagram showing an example of the configuration of an information delivery system 100 according to a first embodiment. The information delivery system 100 according to the first embodiment is a system that delivers information on POIs to vehicles.

The information delivery system 100 includes a server 1 and a vehicle 2. Although the information delivery system 100 includes a plurality of vehicles 2, only one vehicle 2 is shown in FIG. 1 for convenience. The server 1 and the vehicle 2 are each connected to a network N1 so that they can communicate with each other through the network N1. The network N1 is a public line network such as the Internet.

The vehicle 2 is a connected car that can connect to the network N1 for communication with other devices. The vehicle 2 sends vehicle travel information to the server 1 in a predetermined cycle. The vehicle travel information includes the information from various sensors acquired while the vehicle 2 is traveling. More specifically, the vehicle travel information includes the identification information on the vehicle 2, timestamp, position information, travel speed, and images captured by an in-vehicle camera. Note that the vehicle travel information includes, but not limited to, the information given above. The sending cycle of the vehicle travel information is freely set by the user of the vehicle 2 or by the administrator of the information delivery system 100, for example, ranging from one second to one minute. Note that the vehicle travel information may be sent also when a predetermined event occurs. Examples of events that trigger the sending of the vehicle travel information include a case when the ignition switch of the vehicle 2 is turned on or off and a case when a collision is detected.

When route guidance is performed by the car navigation function, the vehicle 2 also sends the route information on the route, on which the vehicle 2 is traveling, to the server 1. The route information includes, for example, a destination and a route from the position of the vehicle 2 to the destination. In the description below, the vehicle travel information and the route information are collectively referred to as movement information.

In the first embodiment, the server 1 delivers the information on POIs that are located in the traveling direction of the vehicle 2, around the destination, and along the traveling, based on the vehicle travel information and the route information on the vehicle 2. The information on POIs includes, for example, the advertisements for stores, for facilities, and for sightseeing spots, the information on service areas (SA) and parking areas (PA), and the information on the weather around the destination. In the description below, the information on a POI is simply referred to as POI information.

(1) The server 1 determines a geographical range in which the provision of POI information to the user of the vehicle 2 is effective, based on the position of the POI corresponding to the POI information and the movement information received from the vehicle 2. In the description below, the geographical range in which the provision of POI information is effective to the user of the vehicle 2 is simply referred to as an effective range. Once the vehicle 2 has passed a target POI, the information on the target POI may no longer be useful to the user of the vehicle 2. For example, if the information on the target POI is provided after passing the target POI, it is unlikely that the user of the vehicle 2 will turn back to visit the target POI. Therefore, when a target POI is located ahead in the traveling direction of the vehicle 2, the effective range of the POI information is set on the vehicle 2 side when viewed from the target POI.

In the first embodiment, in addition to the effective range, the server 1 sets an effective period, which is a period during which the provision of POI information to the user of the vehicle 2 is effective, effective weather, etc., according to the type of POI. For example, when the POI is a restaurant, the business hours of the restaurant are set as the effective period. This is because, even if the information on the restaurant is provided to the user of the vehicle 2 outside business hours, the user cannot use the restaurant. For example, when the POI is a scenic location, sunny and cloudy are set as the effective weather. This is because, if the weather is bad, there is a high possibility that the user cannot see the scenery. In the description below, conditions that are set in the POI information, such as the effective range and the effective period, are referred to as POI information provision conditions.

(2) The server 1 delivers POI information to the vehicle 2 together with the conditions, such as the effective range, that have been set. (3) When POI information is received from the server 1 and when the conditions, such as the effective range, received with the POI information are satisfied, the vehicle 2 provides the received the POI information to the user, for example, by displaying on the display or by outputting sound from the speaker.

According to the first embodiment, when conditions, such as an effective range, are set for POI information and, when the conditions, such as the effective range, are satisfied, the POI information is provided to the user of the vehicle 2. Providing POI information in this manner makes it possible to prevent the provided POI information from becoming meaningless, allowing the POI information to be provided in a more timely manner.

Figure 2:
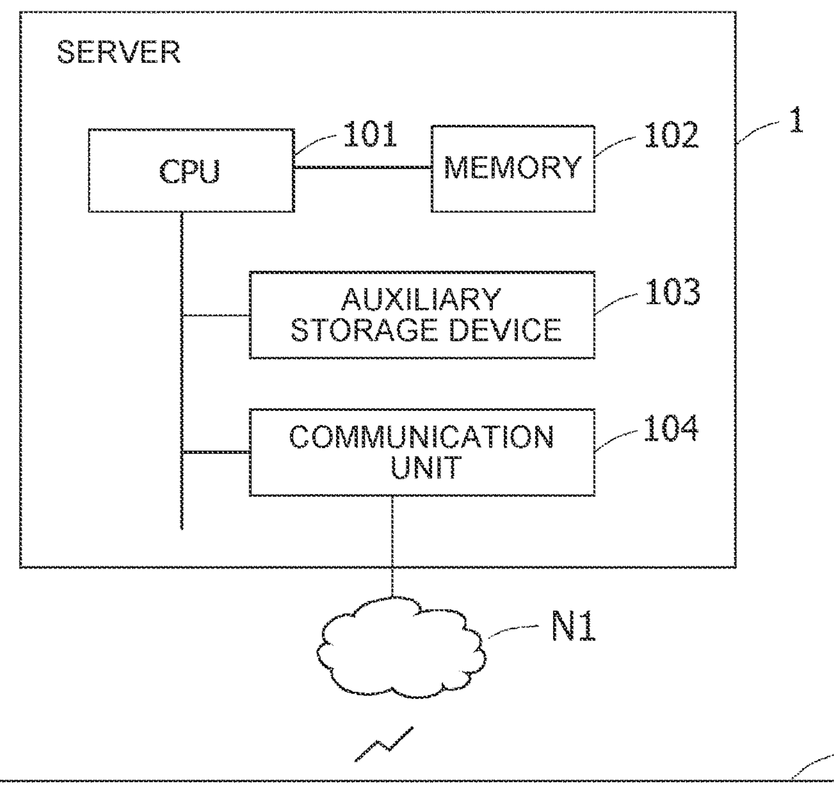
FIG. 2 is a diagram showing an example of a hardware configuration of a server and a vehicle.
Figure 2:
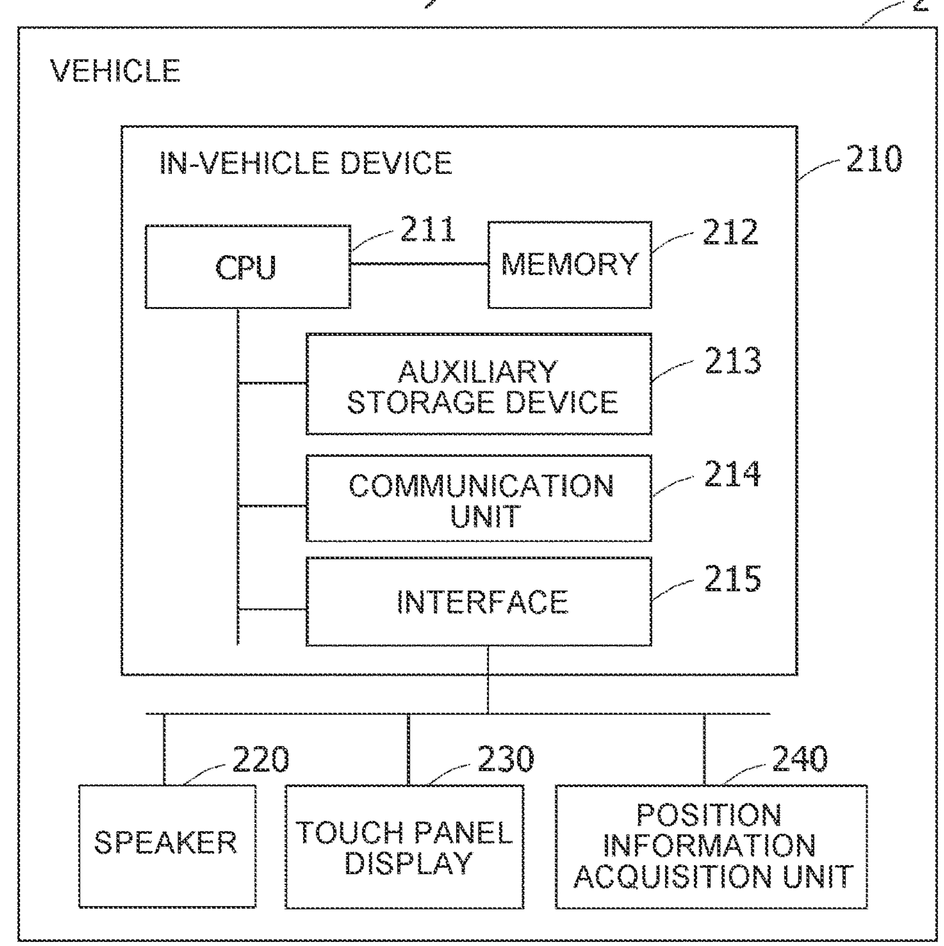

FIG. 2 is a diagram showing an example of a hardware configuration of the server 1 and the vehicle 2. The hardware configuration of the server 1 includes a CPU 101, a memory 102, an auxiliary storage device 103, and a communication unit 104. The auxiliary storage device 103 is a device such as a hard disk drive (HDD) and a solid-state drive (SSD). The programs held in the auxiliary storage device 103 include, for example, an operation system (OS) and a plurality of other programs. The memory 102 includes, for example, semiconductor memories such as a read only memory (ROM) and a random access memory (RAM). Each of the memory 102 and the auxiliary storage device 103 is an example of a computer-readable recording medium.

The CPU 101 loads the OS and various other programs from the auxiliary storage device 103 into the memory 102 for execution to perform various types of processing. Not only one but also two or more CPUs 101 may be provided. In the first embodiment, the CPU 101 is an example of a "control unit."

The communication unit 104 is a module, such as a LAN (Local Area Network) card and an optical module, to which a network cable is connected and that has a signal processing circuit. The communication unit 104 may not only be a circuit connectable to a wired network but may also be a wireless signal processing circuit capable of processing wireless signals of a wireless communication network such as WiFi. In the first embodiment, the server 1 is an example of the "information processing device."

Next, FIG. 2 shows the components that are included in the configuration of the vehicle 2 and are related to the processing of the information delivery system 100. The configuration of the vehicle 2 is not limited to that shown in FIG. 2. The vehicle 2 includes an in-vehicle device 210, a speaker 220, a touch panel display 230, and a position information acquisition unit 240. These components are interconnected, for example, by an in-vehicle network such as a controller area network (CAN) and an in-vehicle Ethernet.

The position information acquisition unit 240 is, for example, a Global Positioning System (GPS) receiver. The position information acquisition unit 240 acquires the position information on the vehicle 2 in a predetermined cycle. The cycle in which the position information acquisition unit 240 acquires the position information is set, for example, from 0.1 second to one second.

In the first embodiment, in a predetermined cycle, the in-vehicle device 210 acquires the position information and the values detected by the other sensors, generates the vehicle travel information, and sends the generated vehicle travel information to the server 1. The in-vehicle device 210 is, for example, a data communication module (DCM), a drive recorder having the communication function, or a car navigation system. In FIG. 2, the in-vehicle device 210 is assumed to be a data communication device. The hardware configuration of the in-vehicle device 210 includes a CPU 211, a memory 212, an auxiliary storage device 213, a communication unit 214, and an interface 215. The CPU 211, memory 212, and auxiliary storage device 213 are similar to the CPU 101, memory 102, and auxiliary storage device 103, respectively.

The communication unit 214 communicates with an external device based on the wireless communication system such as the 5G, 6G, or 4G mobile communication standard, Wi-Fi, or Dedicated Short Range Communications (DSRC). The interface 215 is an interface for connection to the in-vehicle network. In the following description, the processing actually performed by the in-vehicle device 210 is described as being performed by the vehicle 2 for the sake of convenience. Note that the hardware configurations of the server 1 and the vehicle 2 are not limited to the configurations shown in FIG. 2. In the first embodiment, the vehicle 2 or the in-vehicle device 210 is an example of a "mobile terminal."

Figure 3:
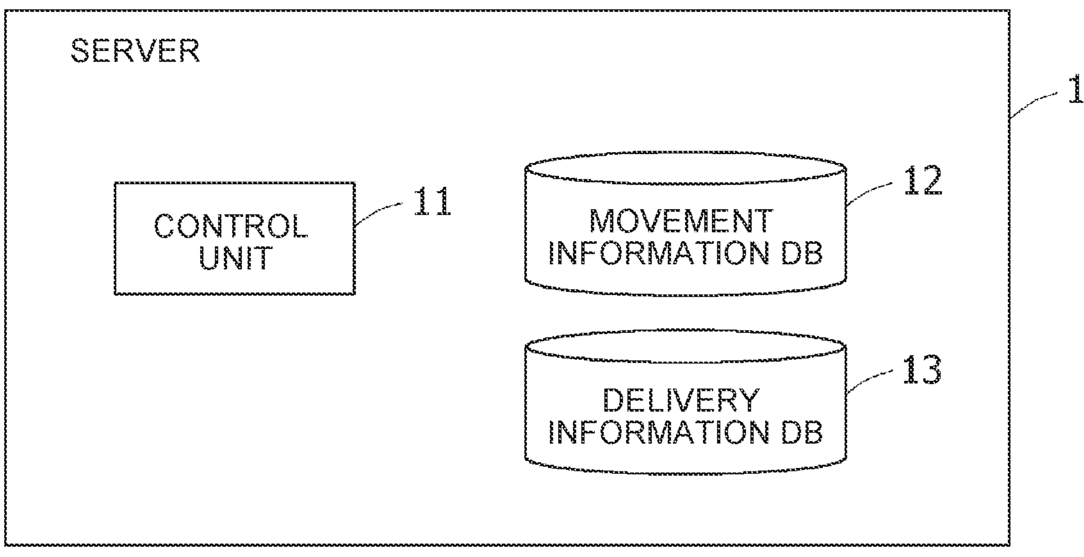
FIG. 3 is a diagram showing an example of a functional configuration of the server and the vehicle.
Figure 3:
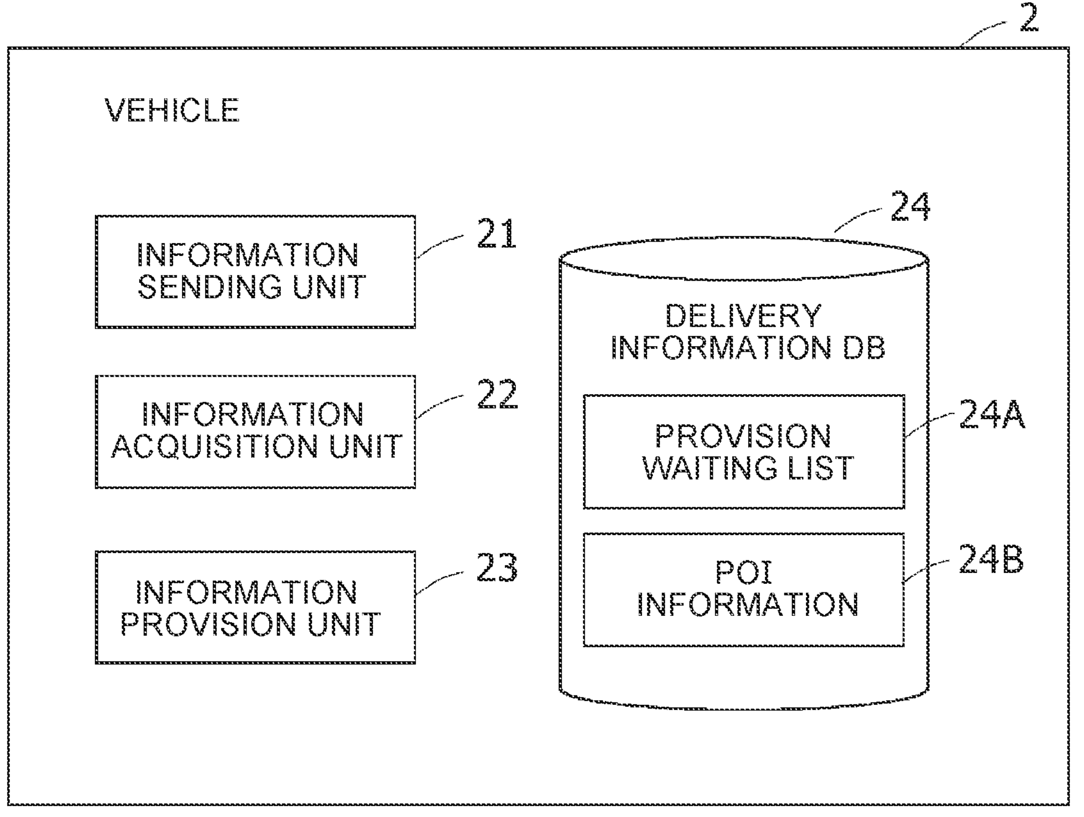

FIG. 3 is a diagram showing an example of functional configurations of the server 1 and the vehicle 2. The functional configuration of the server 1 includes a control unit 11, a movement information DB 12, and a delivery information DB 13. The functions of these functional components are each achieved when the CPU 101 of the server 1 executes predetermined programs.

When movement information is received from the vehicle 2, the control unit 11 stores the received movement information in the movement information DB 12. In addition, the control unit 11 acquires POI information, for example, by input from the administrator of the information delivery system 100, by receiving from an external device, by accessing an external device in a predetermined cycle, and by searching the Internet in a predetermined cycle. The control unit 11 stores the POI information, acquired in this way, in the delivery information DB 13.

The control unit 11 receives a delivery information acquisition request, for example, from the vehicle 2. The delivery information acquisition request is a request for delivering POI information, which is information on the POIs around the vehicle 2, around the route, and around the destination, to be provided to the user of the vehicle 2. The delivery information acquisition request is sent from the vehicle 2 to the server 1 in a predetermined cycle, for example, while the vehicle 2 is moving. Together with the delivery information acquisition request, the control unit 11 receives the information such as the identification information on the user of the vehicle 2 and, when route guidance is being performed in the vehicle 2, the route information. When the user of the vehicle 2 specifies a POI genre for which the delivery of POI information is desired, the control unit 11 may receive the information on the type of the POI, for which information delivery is desired, from the vehicle 2 together with the delivery information acquisition request. Note that the information received together with the delivery information acquisition request includes, but not limited to, the information described above.

When the delivery information acquisition request is received from the vehicle 2, the control unit 11 selects, from the delivery information DB 13, the POI information to be delivered to the vehicle 2 and sets provision conditions for each piece of the selected POI information. The POI information to be delivered to the requesting vehicle 2 is selected, for example, based on the movement information on the vehicle 2, the genre of the destination, the user-specified genre of POI, and the behavioral tendency of the user of the vehicle 2.

The POI information to be delivered to the vehicle 2 is the information on POIs that are in the range from the position of the vehicle 2 to the position near to the destination. Those POIs include the following: POIs located along and around the roads included in the route of the vehicle 2, POIs near service areas, parking areas, and interchanges when the vehicle 2 is traveling on a highway, POIs in the same genre as the destination, POIs in the same genre as the user-specified genre, POIs that are chain stores frequently visited by user of the vehicle 2, and POIs that are sightseeing spots outside the living area of the user of the vehicle 2. The stores frequently visited by the user of the vehicle 2 and the living area of the user of the vehicle 2 are acquired based on the behavioral tendency of the user of the vehicle 2. The behavioral tendency of the user of the vehicle 2 may be acquired by collecting statistics from the history of the movement information of the vehicle 2 or by using a machine learning model that has already learned the relationship between the user's attributes and the history of movement information.

The POI information to be delivered to the vehicle 2 may also be selected using a machine learning model. The machine learning model is a model that has already learned, for the user of the vehicle 2 or for a plurality of users, the user attribute information and the relationship between the history of movement information and the POIs visited during the movement indicated by the movement information. The control unit 11 may input the user attribute information on the user of the vehicle 2 and the movement information on the movement currently being executed to this machine learning model and, based on the output of the machine learning model, determine the POI information to be delivered to the vehicle 2. Examples of the user attribute information that is input to the machine learning model include the gender, age, residential area, and family structure. Examples of the movement information that is input to the machine learning model include the position information, route, and destination of the vehicle 2. The machine learning model may be any one of a neural network, a deep learning model, a convolutional neural network, and a recursive neural network. The machine learning model used to select POI information to be delivered to the vehicle 2 is not limited to a model based on any particular algorithm.

When the distance from the vehicle 2 to the destination is shorter than a predetermined value, the control unit 11 may determine not to deliver the POI information. This is because, when the vehicle 2 is near the destination, the user of the vehicle 2 is less likely to stop at other POIs and, therefore, the effect of delivering POI information is low. In addition, for a POI that is less than a given distance from the vehicle 2, since the user of the vehicle 2 will not be ready to stop at the POI in many cases and, as a result, will travel past the POI, the control unit 11 may select not to deliver the POI information on that POI even when the POI is along the route.

After selecting POI information to be delivered to the vehicle 2, the control unit 11 sets provision conditions for each piece of the selected POI information, for example, based on the movement information on the vehicle 2 and on the POI information. Out of the effective range, effective period, and other conditions, which of the items are to be set for the provision conditions are predetermined depending upon the POI genre.

The effective range of POI information is set for any POI genre. The control unit 11 sets the effective range of POI information, for example, according to the traveling direction of the vehicle 2, the speed of the vehicle 2, and whether the vehicle 2 is traveling on a highway or a normal road. The effective range of POI information is set in such a way that the target POI is located ahead in the traveling direction of the vehicle 2. For example, when the vehicle 2 is traveling from east to west, the effective range of the POI information is set in the east side when viewed from the target POI. Conversely, when the vehicle 2 is traveling from west to cast, the effective range of the POI information is set in the west side as viewed from the target POI. The effective range of the POI information is set larger as the speed of the vehicle 2 is higher. In addition, the effective range of POI information is set larger when the vehicle 2 is traveling on an expressway than when the vehicle 2 is traveling on a normal road.

That is, the size of the effective range is determined according to the speed and whether the vehicle is traveling on an expressway or a normal road, with its setting position determined according to the traveling direction of the vehicle 2. The effective range is indicated, for example, in latitude and longitude according to the determined size and the determined setting position. In addition, when the effective range is defined in advance in terms of time, for example, as a range from X1 minutes to X2 minutes before arriving at the POI, the effective range may be set by converting time to distance according to the speed of the vehicle 2. The speed of the vehicle 2 can be acquired from the vehicle travel information received from the vehicle 2. The traveling direction of the vehicle 2 and the type of the road on which the vehicle 2 is traveling can be acquired, for example, from the position information included in the vehicle travel information or from the route information.

The effective period of POI information is set, for example, when the POI genre is stores and facilities that have business hours or operating hours or when the POI is a scenic point where the landscape changes depending on the time of day. In this case, the effective period of the POI information is set to the business hours or operating hours or to the scenic hours of the day. When the content of the POI information is time-related content such as the information on a limited-time offer, the effective period of the POI information is set to the period of the limited-time offer.

Other items of the provision conditions include weather. For example, for scenic points or for facilities that are outdoors and unavailable in bad weather, the provision conditions for effective weather are set for the POI information. The provision conditions for weather are weather conditions such as a sunny weather and a cloudy weather. The items of provision conditions are not limited to an effective range, effective period, and weather, but may be added as appropriate according to the type of POI.

The control unit 11 sends the selected POI information and the provision conditions for each piece of POI information to the vehicle 2 from which the delivery information acquisition request is received. The control unit 11 may select POI information to be delivered to each vehicle 2 in advance and, when a delivery information acquisition request is received from the vehicle 2, set the provision conditions for each piece of POI information that has been selected in advance.

The movement information DB 12 and the delivery information DB 13 are created in the auxiliary storage device 103 of the server 1. The movement information DB 12 stores movement information received from the vehicle 2. The delivery information DB 13 includes POI information the control unit 11 has collected by searching the Internet and POI information that is requested to be delivered to the vehicle 2 and is received from an external device.

Next, the functional configuration of the vehicle 2 includes an information sending unit 21, an information acquisition unit 22, an information provision unit 23, and a delivery information DB 24. The functions of these functional components are each achieved when the CPU 211 of the in-vehicle device 210 executes predetermined programs.

In a predetermined cycle, the information sending unit 21 collects detection values from the sensors mounted on the vehicle 2, generates vehicle travel information, and sends the generated vehicle travel information to the server 1. The sending cycle of the vehicle travel information is set, for example, from 0.1 second to ten seconds.

The information acquisition unit 22 sends a delivery information acquisition request to the server 1 in a predetermined cycle. The sending cycle of the delivery information acquisition request is set, for example, from one minute to ten minutes. Together with the delivery information acquisition request, the identification information on the user of the vehicle 2, the route information generated when route guidance is being performed in the vehicle 2, and the user-specified POI genre, if pre-set, are also sent.

The information acquisition unit 22 receives one or more pieces of POI information and provision conditions from the server 1 as a response to the delivery information acquisition request. The information acquisition unit 22 stores the received POI information and provision conditions in the delivery information DB 24.

The information provision unit 23 controls processing to provide the POI information, received from the server 1, to the user. In the first embodiment, the information provision unit 23 determines whether to provide the POI information to the user based on the travel state of the vehicle 2 and the POI information provision conditions.

The information provision unit 23 determines that POI information can be provided when the vehicle 2 is in the travel state in which safe travel can be maintained even if the POI information is provided. When the user is driving the vehicle 2, it is necessary to pay attention to the surroundings. In particular, the user is required to pay more attention to the surroundings when entering an intersection, turning right or left in an intersection, waiting to turn right or left in an intersection, and checking for a stop. If POI information is provided in such cases, the driving user's attention may be diverted to the POI information, which may interfere with safe travel. It can be also considered that, when the user does not pay attention to POI information during driving, the effect of providing the POI information will be reduced.

Therefore, the information provision unit 23 determines not to provide POI information when the travel state of the vehicle 2 is a predetermined travel state in which, if the POI information is provided, safe travel may not be maintained. The predetermined travel states of the vehicle 2 in which safe travel may not be maintained if POI information is provided include, for example, the states in which the vehicle 2 is entering an intersection, in which the vehicle 2 is turning right or left in an intersection, in which the vehicle 2 is waiting for a right or left turn in an intersection, and in which the user is checking for a stop. On the other hand, the states of the vehicle 2 in which safe travel can be maintained even if POI information is provided are states other than the above-mentioned predetermined travel states. The travel state of the vehicle 2 can be detected, for example, from the detection values of various sensors of the vehicle 2 and from the position information. The predetermined travel state of the vehicle 2 in which safe travel may not be maintained if POI information is provided is an example of the "predetermined movement state" of the "mobile terminal."

When the POI information provision conditions are satisfied, the information provision unit 23 determines that the POI information can be provided. Conversely, when the POI information provision conditions are not satisfied, the information provision unit 23 determines that the POI information is not to be provided. In addition, when the POI information has been provided or when the POI information has not yet provided and the vehicle has passed through the effective range or the effective period of the provision conditions has passed, the information provision unit 23 deletes the POI information from the delivery information DB 24. Details of processing performed by the information provision unit 23 will be described later.

The delivery information DB 24 is created in the auxiliary storage device 213 of the in-vehicle device 210. The delivery information DB 24 stores a provision waiting list 24A and POI information 24B. The provision waiting list 24A is a list of POI information that is suspended to be provided to the user. The POI information 24B is POI information the information acquisition unit 22 has acquired from the server 1. Note that the functional configurations of the server 1 and the vehicle 2 are exemplary and are not limited to the functional configuration shown in FIG. 3.

FIG. 4 is a diagram showing an example of the provision waiting list 24A held in the vehicle 2. One record of the provision waiting list 24A corresponds to one piece of POI information held in the POI information 24B. A record of the provision waiting list 24A includes fields such as the information ID, effective range, effective period, and weather. The information ID field stores the identification information on POI information. The identification information on POI information used in the provision waiting list 24A may be given by the server 1 or may be given by the information acquisition unit 22 when the POI information is acquired from the server 1 for identifying the POI information in the in-vehicle device 210.

The effective range field, effective period field, and weather field store, respectively, the effective range, effective period, and weather included in the POI information provision conditions received together with the POI information from the server 1. The POI information provision conditions include an effective range as a mandatary item. On the other hand, since the items other than the effective range are optional in the POI information provision conditions, no value is stored in the provision waiting list 24A for an item not included in the POI information provision conditions.

When POI information and provision conditions are received from the server 1, the information acquisition unit 22 stores the POI information in the POI information 24B and adds a record including the content of the provision conditions to the provision waiting list 24A. When POI information is to be deleted from the POI information 24B, the information provision unit 23 deletes the corresponding record from the provision waiting list 24A. The data structure of the provision waiting list 24A is not limited to the example shown in FIG. 4.

Figure 5:
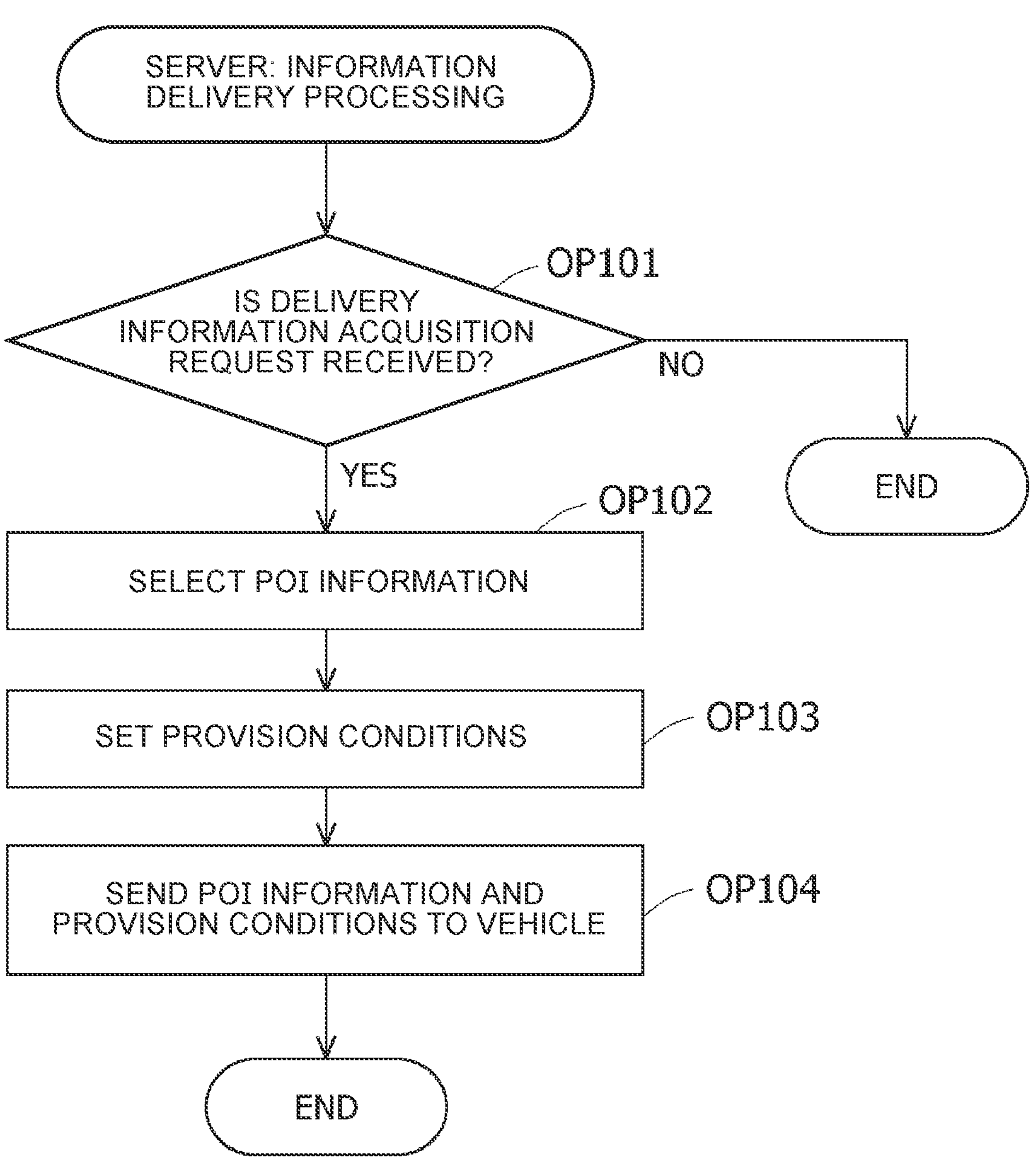
FIG. 5 is an example of a flowchart of information delivery processing by the server.

FIG. 5 shows an example of the flowchart of information delivery processing performed by the server 1. The processing shown in FIG. 5 is repeatedly performed, for example, in a predetermined cycle. Although the processing shown in FIG. 5 is actually performed by the CPU 101, the following description assumes that the processing is performed by the functional components for the sake of convenience.

In OP101, the control unit 11 determines whether a delivery information acquisition request is received from the vehicle 2. When a delivery information acquisition request is received from the vehicle 2 (OP101: YES), the processing proceeds to OP102. When a delivery information acquisition request is not received from the vehicle 2 (OP101: NO), the processing shown in FIG. 5 ends.

In OP102, from the delivery information DB 13, the control unit 11 selects POI information to be sent to the vehicle 2. The method for selecting POI information is as described above. In OP103, the control unit 11 sets provision conditions for each piece of POI information selected in OP102. The method for setting provision conditions is as described above. In OP104, the control unit 11 sends the POI information and the provision conditions to the vehicle 2. After that, the processing shown in FIG. 5 ends. Note that the information delivery processing of the server 1 is not limited to the processing shown in FIG. 5. The delivery processing of POI information and the setting processing of POI information provision conditions, though performed in a series of steps in FIG. 5, may be performed independently.

Figure 6:
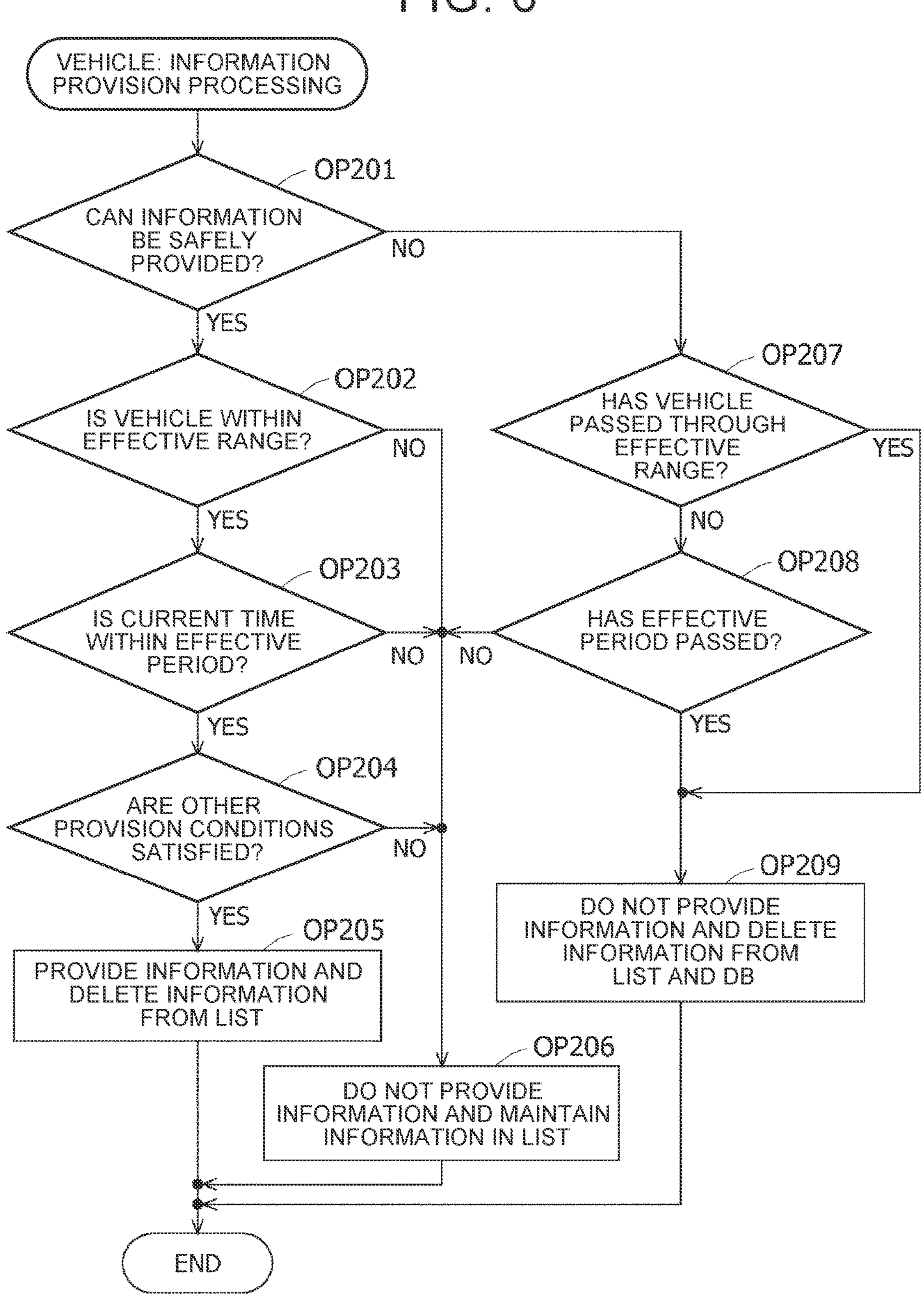
FIG. 6 is an example of a flowchart of information provision processing by the vehicle.

FIG. 6 shows an example of the flowchart of information provision processing performed by the vehicle 2. The processing shown in FIG. 6 is repeatedly performed, for example, in a predetermined cycle of one second to ten seconds. The processing shown in FIG. 6 is performed for each of the records in the provision waiting list 24A. Although the processing shown in FIG. 6 is actually performed by the CPU 211 of the in-vehicle device 210, the following description assumes that the processing is performed by the functional components for the sake of convenience. 25

In OP201, the information provision unit 23 determines whether the vehicle 2 is in the state in which POI information can be safely provided. The state in which POI information can be safely provided means, for example, that the travel state of the vehicle 2 does not correspond to a predetermined state in which, if POI information is provided, safe travel may not be maintained. When the vehicle 2 is in the state in which POI information can be safely provided (OP201: YES), the processing proceeds to OP202. When the vehicle 2 is not in the state in which POI information can be safely provided (OP201: NO), the processing proceeds to OP207.

The processing from OP202 to OP206 is the processing that is performed when vehicle 2 is in the travel state in which POI information can be safely provided. In OP202, the information provision unit 23 determines whether the position of the vehicle 2 is within the effective range of the corresponding POI information. When the position of the vehicle 2 is within the effective range of the corresponding POI information (OP202: YES), the processing proceeds to OP203. When the position of the vehicle 2 is outside the effective range of the corresponding POI information (OP202: NO), the processing proceeds to OP206 and the information provision unit 23 determines not to provide the corresponding POI information. In this case, the corresponding POI information is maintained in the provision waiting list 24A.

In OP203, the information provision unit 23 determines whether the current time is within the effective period of the corresponding POI information. When the current time is within the effective range of the corresponding POI information (OP203: YES), the processing proceeds to OP204. When the current time is before the effective period of the corresponding POI information (OP203: NO), the processing proceeds to OP206 and the information provision unit 23 determines not to provide the corresponding POI information. When an effective period is not set for the POI information provision conditions, the determination result of OP203 is affirmative.

In OP204, the information providing unit 23 determines whether the provision conditions for the other items of the corresponding POI information are satisfied. For example, when weather is set as one of the other items, the information providing unit 23 acquires the information on the weather of the area where the vehicle 2 is currently positioned, for example, from the Internet or an external server to determine whether the provision conditions for weather are satisfied. When the provision conditions for the other items of the corresponding POI information are satisfied (OP204: YES), the processing proceeds to OP205. When the provision conditions for the other items of the corresponding POI information are not satisfied (OP204: NO), the processing proceeds to OP206 and the information providing unit 23 determines not to provide the corresponding POI information. When items other than the effective range and the effective period are not set for the provision conditions of the POI information, the determination result of OP204 is affirmative.

In OP205, the information providing unit 23 outputs the corresponding POI information, for example, from the touch panel display 230 and the speaker 220 for provision to the user. In addition, the information providing unit 23 deletes the corresponding POI information from the POI information 24B and deletes the record corresponding to the corresponding POI information from the provision waiting list 24A. After that, the processing shown in FIG. 6 ends.

The processing from OP207 to OP209 is the processing that is performed when the vehicle 2 is not in the state in which POI information can be safely provided. In OP207, the information providing unit 23 determines whether the vehicle 2 has passed through the effective range of the corresponding POI information. When the vehicle 2 has passed through the effective range of the corresponding POI information (OP207: YES), the processing proceeds to OP209. When the vehicle 2 has not yet passed through the effective range of the corresponding POI information (OP207: NO), the processing proceeds to OP206 and the information providing unit 23 determines not to provide the corresponding POI information. In this case, the corresponding POI information is maintained in the waiting list 24A.

In OP208, the information providing unit 23 determines whether the effective period of the corresponding POI information has passed. When the effective period of the corresponding POI information has passed (OP208: YES), the processing proceeds to OP209. When the effective period of the corresponding POI information has not yet passed (OP208: NO), the processing proceeds to OP206. In OP206, the information providing unit 23 determines not to provide the corresponding POI information, and the corresponding POI information is maintained in the provision waiting list 24A. When the effective period is not set for the provision conditions for the POI information, the determination result of OP208 is negative.

In OP209, the information provision unit 23 determines not to provide the corresponding POI information, deletes the corresponding POI information from the POI information 24B, and deletes the record corresponding to the corresponding POI information from the provision waiting list 24A. After that, the processing shown in FIG. 6 ends. The information provision processing shown in FIG. 6 is an example, and the information provision processing is not limited to the processing shown in FIG. 6. For example, whether to provide POI information may be determined based on whether the provision conditions are satisfied without considering the state of the vehicle 2 as in the determination in OP201.

According to the information provision processing shown in FIG. 6, POI information is provided when the vehicle 2 is in the state in which the information can be provided safely (OP201: YES) and, in addition, the provision conditions are satisfied (OP202 to OP204: YES). Therefore, in the first embodiment, POI information can be provided at a better time when the user of the vehicle 2 can maintain safe travel and when the provision of the POI information does not become meaningless.

Furthermore, according to the information provision processing shown in FIG. 6, when the vehicle 2 is not in the state in which information can be provided safely immediately after POI information is received from the server 1 (OP201: NO) and neither the vehicle has passed through the effective range nor has the effective period passed (OP208: NO), the provision of the POI information is suspended (OP206). After that, when the vehicle 2 enters the state in which information can be provided safely (OP201: YES) and the provision conditions are satisfied (OP202 to OP204: YES), the POI information is provided (OP205). Therefore, according to the first embodiment, the provision of POI information, even if once suspended due to the travel state of the vehicle 2, may be performed when the vehicle 2 enters the travel state in which information can be provided safely, meaning that the opportunity to provide POI information is increased.

Furthermore, according to the information provision processing shown in FIG. 6, when the vehicle has passed through the effective range, or the effective period has passed, without providing the POI information (OP207: YES, OP208: YES), the POI information is deleted from the delivery information DB 24. The POI information corresponding to an effective range through which the vehicle has passed or corresponding to an effective period that has passed will not be provided thereafter. Deleting such POI information from the delivery information DB 24 prevents the resources of the auxiliary storage device 213 of the in-vehicle device 210 from being used for the POI information that will not be provided in the future, thus saving the resources.

Other Modifications

The above embodiment is merely an example, and the present disclosure can be modified as appropriate without departing from the spirit of the present disclosure.

In the first embodiment, the server 1 sets POI information provision conditions, and the vehicle 2 determines whether to provide the POI information. The present disclosure is not limited to this mode of processing; for example, the vehicle 2 may set POI information provision conditions and determine whether to provide the POI information. This mode of processing can be implemented by storing information, such as map information, in the vehicle 2. In this case, the vehicle 2 or the in-vehicle device 210 is an example of an "information processing device" as well as a "mobile terminal." The CPU 211 is an example of a "control unit."

Alternatively, the server 1 may set POI information provision conditions and determine whether to provide the POI information. Since the vehicle travel information is received from the vehicle 2 in a predetermined cycle, the server 1 can determine whether the vehicle 2 is in the state in which the information can be provided safely. In this case, when it is determined that the POI information can be provided, the server 1 may send the corresponding POI information to the vehicle 2; alternatively, with the POI information sent to the vehicle 2 in advance, the server 1 may send to the vehicle 2 an instruction to provide the corresponding POI information at a time when it is determined that the corresponding POI information can be provided.

In the first embodiment, the server 1 sets POI information provision conditions based on the POI information. However, the present disclosure is not limited to this mode, and the provider of POI information may also set the POI information provision conditions. Examples of providers of POI information include the administrators of stores and facilities, companies, and public offices. Allowing the providers of POI information to specify POI information provision conditions makes it possible to provide the POI information at a time when the providers of the POI information desire.

In the first embodiment, the in-vehicle device 210 is used as an example of a mobile terminal, and movement by the vehicle 2 as an example of movement. However, the information delivery system 100 may include other devices such as a smartphone, a tablet terminal, and a wearable terminal as a mobile terminal, and allows POI information delivery to be carried out for movement by walking or by a bicycle. In this case, POI information delivery can be implemented by changing the definition of the state in which information can or cannot be provided safely in accordance with means of movement such as walking or cycling.

The processing and means described in the present disclosure can be freely combined for implementation as long as there is no technical contradiction.

The processing described as being performed by one device may be divided for execution by a plurality of devices. Conversely, the processing described as being performed by different devices may be performed by one device. In the computer system, what hardware configuration (server configuration) is used for implementing each function can be flexibly changed.

The present disclosure can also be implemented by supplying to a computer a computer program that implements the functions described in the above embodiments and by causing one or more processors of the computer to read the program for executing it. Such a computer program may be provided to the computer by a non-transitory computer-readable storage medium that can be connected to the system bus of the computer or may be provided to the computer via a network. The non-transitory computer-readable storage medium includes any type of disk, such as a magnetic disk (floppy (registered trademark) disk, hard disk drive (HDD), etc.) and an optical disc (CD-ROM, DVD disc, Blu-ray disc, etc.), and any type of medium suitable for storing electronic instructions such as a read only memory (ROM), a random access memory (RAM), an EPROM, an EEPROM, a magnetic card, a flash memory, and an optical card.

What is claimed is:

1. A mobile terminal comprising:

a processor programmed to acquire a first geographical range based on position information on a first Point Of Interest (POI) and on information on movement of a mobile terminal, the first geographical range being a range in which provision of information on the first POI to a user of the mobile terminal is effective;

receive, from a server, the information on the first POI and the first geographical range;

provide the information on the first POI to the user of the mobile terminal when the mobile terminal is within the first geographical range;

store the information on the first POI in a memory;

provide the information on the first POI when the mobile terminal is not in a predetermined movement state and the mobile terminal is positioned within the first geographical range;

suspend providing the information on the first POI when the mobile terminal is in the predetermined movement state; and in response to the mobile terminal having passed through the first geographical range without providing the information on the first POI, delete the information on the first POI from the memory, wherein the predetermined movement state includes at least one of a state in which a vehicle including the mobile terminal is entering an intersection, a state in which the vehicle is turning right or left in an intersection, and a state in which the vehicle is waiting for a right or left turn in an intersection.

2. The mobile terminal according to claim 1, wherein the information on the movement of the mobile terminal includes information on at least one of a speed, a traveling direction, a route, and a type of road on which the mobile terminal is travelling.

3. The mobile terminal according to claim 1, wherein a size of the first geographical range is set based on a speed of the mobile terminal, such that the first geographical range is set larger as the speed of the mobile terminal is higher.

* * * * *